United States Patent Office 3,078,269
Patented Feb. 19, 1963

3,078,269
DERIVATIVES OF 6-AMINO PENICILLANIC ACID
Billie Kenneth Koe, Gales Ferry, and Thomas A. Seto, Groton, Conn., assignors to Chas. Pfizer & Co., Inc., Brooklyn, N.Y., a corporation of Delaware
No Drawing. Filed Jan. 10, 1961, Ser. No. 81,688
14 Claims. (Cl. 260—239.1)

This invention relates to new antibiotic compounds and their salts and, more particularly, to novel 6-aminopenicillanic acid derivatives and their salts which exhibit antagonism toward the antibiotic resistant Staphylococci and resistance to penicillinase.

The term "penicillin" includes a number of acyl derivatives of 6-aminopenicillanic acid which differ only in the nature of the R' group and possess the general formula:

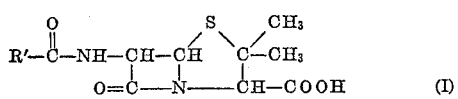

in which the acyl moiety is derived from a hydrocarbon carboxylic acid. Also known, but of little practical therapeutic value, are a few acyl derivatives or 6-aminopenicillanic acid wherein the acyl moiety is an organosulfonic acid moiety, such as benzenesulfonyl- or p-toluenesulfonyl-. In such instances, of course, the carbonyl group of Formula I is replaced by a sulfonyl (—SO$_2$—) group.

The properties, particularly the antibiotic properties, of a particular penicillin are determined to a large extent by the R' group. The best known and most widely used penicillins are benzylpenicillin, phenoxymethylpenicillin and, more recently, α-phenoxyethylpenicillin wherein R' (Formula I) represents the benzyl-, phenoxymethyl- and α-phenoxyethyl radicals. These compounds are effective via both parenteral and oral administration in the treatment of bacterial infections due to Gram-positive organisms but are far less effective against Gram-negative organisms, many of which are resistant to their action. These, and other presently available penicillins, however, are ineffective against penicillinase producing strains of bacteria, the so-called antibiotic resistant bacteria such as *Escherichia coli*, *Bacillus subtilis*, *Bacillus cereus* and various Staphylococci strains. Antibiotic resistant bacteria, Staphylococci in particular, are becoming the most important cause of severe infections and deaths in hospitals today. Drugs which will combat the continuing rise in Staphylococci incidence and fatality are, therefore, of immeasurable value to the medical profession.

There has now been discovered a series of novel and valuable derivatives of 6-aminopenicillanic acid which, in addition to their antagonism toward Gram-positive microorganisms, are surprisingly resistant to the effect of penicillinase and, therefore, of value in the treatment of bacterial infections due to penicillinase-producing organisms resistant to the presently available penicillins. The novel compounds of this invention present a complete structural departure from the heretofore known penicillin antibiotics in having a direct nitrogen to phosphorus linkage in the side chain in place of the amide group of the presently available penicillins. They have, in the acid form, the formula:

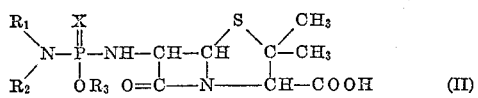

wherein R$_1$ and R$_2$ are the same or different and are selected from the group consisting of hydrogen, lower alkyl which may be straight or branched chain, benzyl, phenyl and substituted phenyl wherein the substituent is selected from the group consisting of chloro, bromo, methyl and lower alkoxy; R$_3$ is selected from the group consisting of lower alkyl, chloro (lower) alkyl, bromo (lower) alkyl, phenyl and substituted phenyl wherein the substituent is selected from the group consisting of methyl, chloro, bromo, nitro, amino and lower alkoxy; and X is selected from the group consisting of oxygen and sulfur. By lower alkyl and lower alkoxy is meant alkyl and alkoxy groups containing 1 to 4 carbon atoms.

The new antibiotics can be named by reference to the 6-aminopenicillanic acid moiety or the amidophosphoric acid or amidothionophosphoric acid moiety as the parent compound. Thus, for example, when considered as derivatives of 6-aminopenicillanic acid, the compound wherein X is oxygen, R$_1$ and R$_2$ are ethyl and R$_3$ is phenyl is named 6-[(O-phenyl)(N,N-diethylamido)phosphorylamido] penicillanic acid. The same compound, when considered as an amidophosphoric acid is named phenyl-[N-(6-penicillanyl)(N',N'-diethylamido)]phosphate. It is preferred to name them as derivatives of 6-aminopenicillanic acid since this system of nomenclature points, at one and the same time, to their structural similarity and dissimilarity to the penicillins of Formula I.

Included in the present invention are the pharmaceutically acceptable salts of these novel penicillins, that is, non-toxic metal salts such as the sodium, potassium, calcium and magnesium salts, and non-toxic ammonium and substituted ammonium salts, for example, salts of such non-toxic amines as procaine, dibenzylamine, N,N'-dibenzylethylenediamine, 1-ephenamine, N-benzyl-β-phenethylamine, dehydroabietylamine and other amines which have been used to form salts with benzylpenicillin.

In addition to their resistance or inertness to penicillinase and their significant antagonism toward the antibiotic resistant bacteria, the valuable products of this invention also demonstrate antagonism toward Gram-positive organisms although the activity is generally somewhat lower than that of benzylpenicillin. Several of these novel products are active against Gram-negative organisms to a much greater extent than are benzylpenicillin, phenoxymethylpenicillin and other presently available penicillins.

The valuable products of this invention are, therefore, remarkably effective in treating a number of Gram-positive, Gram-negative and antibiotic resistant infections in poultry and animals including man. For this purpose, the pure materials or mixtures thereof with other antibiotics can be employed. They may be administered alone or in combination with a pharmaceutical carrier selected on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents or be injected parenterally, that is, for example, intramuscularly or subcutaneously. For parenteral administration they are best used in the form of a sterile aqueous solution which may contain other solutes, for example, enough saline or glucose to make the solution isotonic. The particular regimen and dosage adopted will be assessed by the physician according to the age, weight and condition of the patient. In general, however, the dosage will be approximately the same order of magnitude as is used in the case of phenoxymethylpenicillin treatment of Gram-positive infections.

The new and valuable compounds of the present invention are prepared by the reaction, in a suitable reaction-inert solvent, of 6-aminopenicillanic acid with (1) the halogen (chloro or bromo) derivative of the appropriately substituted phosphate moiety:

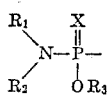

wherein $R_1$, $R_2$, $R_3$ and X are as previously defined, in the presence of an acid acceptor at a pH value of from about 3 to about 9 and at a temperature of from about 0° C. to about 50° C.; (2) or with the appropriate amido phosphoric acid ester $(R_1R_2N) P(X)(OR_3)OH$ in the presence of a condensing agent, such as 1,3-dicyclohexylcarbodiimide, at a pH of from about 6 to about 9.

They can also be prepared by the method of Sheehan, et al., Journal of the American Chemical Society, 81, 3089 (1959) which utilizes D-penicillamine and t-butyl phthalimidomalonaldehydate as starting materials for a series of reactions. Substitution of the phenoxyacetyl chloride utilized by Sheehan et al. by the appropriate halophosphate, for example (N,N-diethylamido)(O-phenyl) phosphoryl chloride in the reaction sequence produces 6 - [(O-phenyl)(N,N-diethylamidophosphoryl)-amido]penicillanic acid potassium salt.

The necessary haloamidophosphate reactants are available via the reaction of the desired primary or secondary amine with the appropriate halophosphate, by esterification of the haloamidophosphate with a hydroxy compound or its sodium salt, or by reaction of an amine hydrochloride with a halo phosphate as described by Kosolapoff "Organo Phosphorous Compounds," J. Wiley and Sons, Inc., N.Y. (1950), Chapter 10.

It is preferred to utilize the reaction of 6-aminopenicillanic acid with the appropriately substituted haloamidophosphate in the presence of an acid acceptor at a moderately acid to moderately alkaline pH level, that is, at pH values of from about 6.0 to about 9.0 in aqueous acetone since this process produces substantial yields of the desired product.

The 6-aminopenicillanic acid can be used in the form of the pure material dissolved or suspended in the solvent of choice, e.g., water, aqueous acetone, or in the form of a fermentation liquor or concentrate thereof prepared, for example, as described by Huang et al. in the J. Am. Chem. Soc. 82, 3790 (1960).

When prepared in this manner the novel antibiotics are obtained as the sodium or potassium salts. They are readily converted to the acid form by neutralization of their aqueous solutions with a mineral acid, such as sulfuric or hydrochloric acids, or a suitable ion exchange resin and are recovered therefrom by standard techniques such as freeze drying or extraction with a suitable water-immiscible solvent followed by removal of the solvent.

The acid forms of the novel antibiotics of the present invention are, in turn, easily converted to salts by reaction with a suitable base. Thus, treatment of the desired antibiotic in aqueous solution with ammonium hydroxide produces the ammonium salt. In like manner other salts such as the calcium, magnesium, barium, potassium and sodium, are formed. In addition, amine salts, such as the procaine, dibenzylamine, N,N'-dibenzylethylenediamine, dehydroabietylamine, 1-ephenamine and N-benzyl-β-phenethylamine salts, are prepared by reacting a solution of the desired antibiotic in an aqueous or non-aqueous solvent with the desired amine. Alternatively, the amine salts are prepared in aqueous solution by reacting a metal salt of the desired antibiotic, e.g. the sodium salt, with the desired amine acid salt, for example, the amine hydrochloride salt.

The valuable nitrophenyl substituted antibiotics of this invention serve as useful intermediates for the production of the corresponding isoteic 6-[(O-aminophenyl)amidophosphoryl)amido]penicillanic acids and the corresponding thiono analogs by catalytic hydrogenation.

The following examples are provided to further illustrate in detail methods for the procedure of the present invention. They are, however, not to be construed as limiting the invention in any way.

EXAMPLE I

A solution of 7.41 g. (30 mM.) of phenyl N,N-diethylamido chlorophosphate (B.P. 111–113°/0.01 mm.) in 45 ml. of acetone is added to a cooled solution of 6.48 g. of 6-aminopenicillanic acid (30 mM.) plus 6.0 g. potassium bicarbonate in 45 ml. of water. The solution is adjusted to pH 7 by adding solid 6-aminopenicillanic acid and the mixture shaken for 5 hours at room temperature. The solution is then clarified and washed with two half-volumes of ether. The aqueous solution is mixed with two volumes of ethyl acetate, and the pH adjusted to 5.5 with dilute hydrochloric acid. The ethyl acetate extract is then washed with one-half volume of water, dried $(Na_2SO_4)$, adjusted to pH 8 with dilute methanolic potassium hydroxide and evaporated to dryness. Trituration of the residue with ether yields the potassium salt of 6-[(O - phenyl)(N,N - diethylamido)phosphorylamido]-penicillanic acid as a white powder.

Additional 6-[amidosphosphorylamido]penicillanic acid derivatives of Formula II are prepared employing suitable amidohalophosphate esters as reactants. The products, obtained as their potassium salts, are listed in Table I. For convenience, only the various values of $R_1$, $R_2$, $R_3$ and X are recorded.

| $R_1$ | $R_2$ | $R_3$ | X |
|---|---|---|---|
| H | H | $C_6H_5$ | O |
| H | H | $C_2H_5$ | S |
| H | H | i-$C_3H_7$ | S |
| H | H | n-$C_4H_9$ | S |
| $C_2H_5$ | $C_2H_5$ | $C_6H_5$ | S |
| $C_2H_5$ | $C_2H_5$ | $C_2H_5$ | O |
| i-$C_3H_7$ | i-$C_3H_7$ | $C_2H_5$ | O |
| $C_4H_9$ | $C_4H_9$ | $C_2H_5$ | O |
| H | $C_6H_5$ | $C_4H_9$ | S |
| H | $C_6H_5$ | $C_2H_5$ | O |
| H | $C_6H_5$ | $C_6H_5$ | O |
| H | p-($CH_3$)$C_6H_4$ | $CH_3$ | O |
| H | p-($CH_3$)$C_6H_4$ | $C_2H_5$ | O |
| H | p-($CH_3$)$C_6H_4$ | $C_6H_5$ | O |
| H | m-($CH_3$)$C_6H_4$ | $C_6H_5$ | O |
| H | H | i-$C_4H_9$ | O |
| H | H | t-$C_4H_9$ | O |
| H | $C_2H_5$ | $C_2H_5$ | S |

EXAMPLE II

A solution of 11.0 g. (50 mM.) of phenyl N,N-dimethylamido chlorophosphate in 40 ml. of acetone is added to a cooled solution of 10.8 g. (50 mM.) of 6-aminopenicillanic acid plus 10.0 g. of potassiumbicarbonate in 40 ml. of water. The solution is adjusted to pH 7 by addition of solid 6-aminopenicillanic acid and agitated for 3 hours at room temperature. The solution is clarified, washed with two half-volumes of ether and extracted with two volumes of ethyl acetate at pH 3.5. The ethyl acetate extract is washed with one-half volume of water, then mixed with an equal volume of water. The mixture is adjusted to pH 6.5 by adding solid calcium hydroxide. The aqueous layer on freeze-drying gives the calcium salt of 6-[(O-phenyl)(N,N-dimethylamido)phosphorylamino]penicillanic acid as a white, non-hygroscopic powder.

Repetition of this procedure but substituting potassium hydroxide (dilute methanolic) for calcium hydroxide produces the potassium salt of 6-[(O-phenyl)(N,N-dimethylamido)phosphorylamido]penicillanic acid as a white powder.

Similarly, additional amido phosphoryl derivatives of 6-aminopenicillanic acid are prepared employing suitable amidohalophosphate esters. The values of $R_1$, $R_2$, $R_3$ and X are listed for convenience.

| $R_1$ | $R_2$ | $R_3$ | X |
|---|---|---|---|
| H | H | $C_2H_5$ | O |
| H | H | n-$C_4H_9$ | O |
| H | H | $C_6H_5$ | S |
| H | $C_6H_5$ | $CH_3$ | S |
| H | $C_6H_5$ | $C_6H_5$ | S |
| H | p-$(CH_3)C_6H_4$ | $C_2H_5$ | O |
| H | p-$(CH_3O)C_6H_4$ | $C_2H_5$ | O |
| H | o-$(CH_3O)C_6H_4$ | $C_2H_5$ | O |
| H | $C_6H_5CH_2$ | $C_2H_5$ | O |
| H | $C_6H_5CH_2$ | $C_2H_5$ | S |
| $CH_3$ | $C_6H_5$ | $CH_3$ | S |
| $C_2H_5$ | $C_2H_5$ | $ClCH_2CH_2$ | O |
| $C_2H_5$ | $C_2H_5$ | $Cl(CH_2)_4$ | O |
| $C_2H_5$ | $C_2H_5$ | $BrCH_2CH_2$ | O |
| $C_2H_5$ | $C_2H_5$ | $Cl(CH_2)_4$ | S |
| $C_2H_5$ | $C_2H_5$ | $C_6H_5CH_2$ | O |
| $C_6H_5$ | $C_6H_5$ | $CH_3$ | O |
| $C_6H_5CH_2$ | $C_6H_5CH_2$ | $CH_3$ | O |
| $C_6H_5CH_2$ | $C_6H_5CH_2$ | $CH_3$ | S |
| H | $CH_3$ | p-$NO_2C_6H_4$ | O |
| H | $CH_3$ | p-$NH_2C_6H_4$ | O |
| H | $CH_3$ | p-$NH_2C_6H_4$ | O |
| H | $CH_3$ | o-$NO_2C_6H_4$ | S |
| H | p-$ClC_6H_4$ | p-$ClC_6H_4$ | O |
| H | o-$BrC_6H_4$ | $CH_3$ | O |
| H | m-$ClC_6H_4$ | $CH_3$ | O |
| p-$(CH_3)C_6H_4$ | p-$(CH_3)C_6H_4$ | $CH_3$ | O |
| H | H | $C_2H_5$ | O |
| H | i-$C_3H_7$ | $C_6H_5$ | S |
| | | | O |

EXAMPLE III

To a solution of 2.3 g. (10 mM.) of phenyl N,N-diethylamidophosphate in 40 ml. of tetrahydrofuran there is added 2.1 g. (10 mM.) of 1,3-dicyclohexylcarbodiimide in 50 ml. of tetrahydrofuran and a solution of 2.2 g. (10 mM.) of 6-aminopenicillanic acid in 50 ml. of water: tetrahydrofuran (1:1) containing sufficient sodium bicarbonate to give a clear solution. The reaction mixture is allowed to stand at room temperature for 1 hour. It is then diluted with water, filtered to remove 1,3-dicyclohexylurea and unreacted 1,3-dicyclohexylcarbodiimide and worked up according to the procedure of Example I. The product, the potassium salt of 6-[(O-phenyl)(N,N-diethylamido) phosphorylamido]penicillanic acid, is identical to the product of Example I.

The following penicillins having the indicated values for $R_1$, $R_2$, $R_3$ and X are prepared by this method.

| $R_1$ | $R_2$ | $R_3$ | X |
|---|---|---|---|
| H | $C_6H_5$ | $C_2H_5$ | O |
| $C_2H_5$ | $C_6H_5$ | $C_2H_5$ | O |
| $C_2H_5$ | $C_6H_5$ | $C_2H_5$ | S |
| $C_2H_5$ | $C_6H_5$ | $C_6H_5$ | O |
| H | $C_6H_5CH_2$ | $CH_3$ | O |
| o-$ClC_6H_4$ | o-$ClC_6H_4$ | $CH_3$ | O |
| p-$(CH_3O)C_6H_4$ | p-$(CH_3O)C_6H_4$ | $CH_3$ | O |
| p-$(C_4H_9O)C_6H_4$ | p-$(C_4H_9O)C_6H_4$ | $CH_3$ | O |
| $CH_3$ | $CH_3$ | p-$NO_2C_6H_4$ | O |

EXAMPLE IV

To an aqueous solution of the potassium salt of 6 - [(O - p - nitrophenyl)(N - methylamido)phosphorylamido]penicillanic acid (0.47 g. in 200 ml. of water) there is added 0.50 g. of 5% palladium-charcoal and the mixture cooled to 4° C. Hydrogen is passed into the mixture at 4° C. until the uptake of hydrogen ceases. The catalyst is then removed by filtration and the filtrate freeze dried to give give the potassium salt of 6-[(O-p-aminophenyl)(N - methylamido)phosphorylamido]penicillanic acid.

In like manner, the following penicillanic acids are prepared as their potassium salts:

*Penicillanic Acid*

6-[(*O-o-aminophenyl*)(*N-methyl-*
*amido*)*phosphorylamido*]

6-[(*O-p-aminophenyl*)(*N,N-*
*dimethylamido*)*phosphorylamido*]

They are converted to their acid form by adsorption on a column of Dowex 50, hydrogen form 100–200 mesh, (a copolymer of styrene and divinylbenzene containing nuclear sulfonic acid groups, available from the Dow Chemical Co.) and elution therefrom with ammonium hydroxide. The acids are recovered by freeze drying the eluates.

EXAMPLE V

The products of Examples I, II and III are converted to their free acid form by acidification of an aqueous solution of their potassium salts to pH 2.5 with hydrochloric acid. The acids are extracted from the aqueous acid solutions with ethylacetate, the ethylacetate solution dried and the acids recovered by evaporation of the solvent.

EXAMPLE VI

The sodium, calcium, magnesium and ammonium salts of the products of Examples IV and V are prepared by neutralizing 0.001 mole of the appropriate acid in 20 ml. of water with an equimolar quantity of sodium, calcium, magnesium or ammonium hydroxide. The salts are isolated by freeze drying.

EXAMPLE VII

To 0.001 mole of each of the acids of Examples IV and V in 10 ml. of methylisobutylketone there is added 0.001 mole of N,N'-dibenzylethylenediamine in 10 ml. of isopropanol and the mixture thoroughly stirred. After 4 hours, the products are recovered by filtration, washed with ether and dried.

In like manner, the following amine salts of the acids of Examples IV and V are prepared:

Dehydroabietylamine
Procaine
Dibenzylamine
1-ephenamine
N-benzyl - β - phenethylamine

EXAMPLE VIII

To 0.001 mole of each of the products of Examples III in 10 ml. of water there is added 09.001 mole of procaine hydrochloride in 20 ml. of water. The products, the procaine salts, precipitate and are recovered by filtration, washed with cold water and dried.

What is claimed is:

1. A compound selected from the group consisting of those having the formula

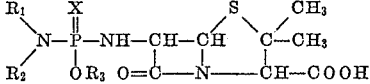

and the pharmaceutically acceptable salts thereof, wherein $R_1$ and $R_2$ are selected from the group consisting of hydrogen, lower alkyl, benzyl, phenyl and substituted phenyl wherein the substituent is selected from the group consisting of methyl, chloro, bromo and lower alkoxy; $R_3$ is selected from the group consisting of lower alkyl, chloro (lower) alkyl, bromo (lower) alkyl, phenyl and substituted phenyl wherein the substituent is selected from the group consisting of methyl, chloro, bromo, amino, nitro and lower alkoxy; and X is selected from the group consisting of oxygen and sulfur.

2. The compound represented by the formula of claim 1 wherein $R_1$ and $R_2$ are lower alkyl, $R_3$ is phenyl and X is oxygen.

3. The compound represented by the formula of claim 1 wherein $R_1$ and $R_2$ are lower alkyl, $R_3$ is lower alkyl and X is oxygen.

4. The compound represented by the formula of claim 1 wherein $R_1$ and $R_2$ are hydrogen, $R_3$ is phenyl and X is oxygen.

5. The compound represented by the formula of claim 1 wherein $R_1$ is hydrogen, $R_2$ is lower alkyl, $R_3$ is phenyl and X is oxygen.

6. The compound represented by the formula of claim wherein $R_1$ and $R_2$ are lower alkyl, $R_3$ is phenyl and X is sulfur.

7. 6-[(O - phenyl)(N,N - diethylamido)phosphorylamido]penicillanic acid potassium salt.

8. 6-[(O - phenyl)(N,N - dimethylamido)phosphorylamido]penicillanic acid potassium salt.

9. 6 - [(O - phenyl)(N - isopropylamido)phosphorylamido]penicillanic acid sodium salt.

10. 6 - [(O-n-butyl)(amido)phosphorylamido]penicillanic acid.

11. 6 - [(O - ethyl)(N,N - diethylamido)phosphorylamido]penicillanic acid potassium salt.

12. 6 - [(O - phenyl)(N,N - diethylamido)thionophosphorylamido]penicillanic acid potassium salt.

13. 6 - [(O - methyl)(N - anilido)phosphorylamido]penicillanic acid N,N'-dibenzylethylenediamine salt.

14. 6 - [(O - o-tolyl)(N - benzylamido)phosphorylamido]penicillanic acid potassium salt.

References Cited in the file of this patent
UNITED STATES PATENTS

| | | |
|---|---|---|
| 2,941,995 | Doyle et al. | June 21, 1960 |

FOREIGN PATENTS

| | | |
|---|---|---|
| 569,728 | Belgium | Nov. 15, 1958 |